Dec. 19, 1950     H. A. MYERS     2,534,527
WORK HOLDER
Filed May 4, 1948
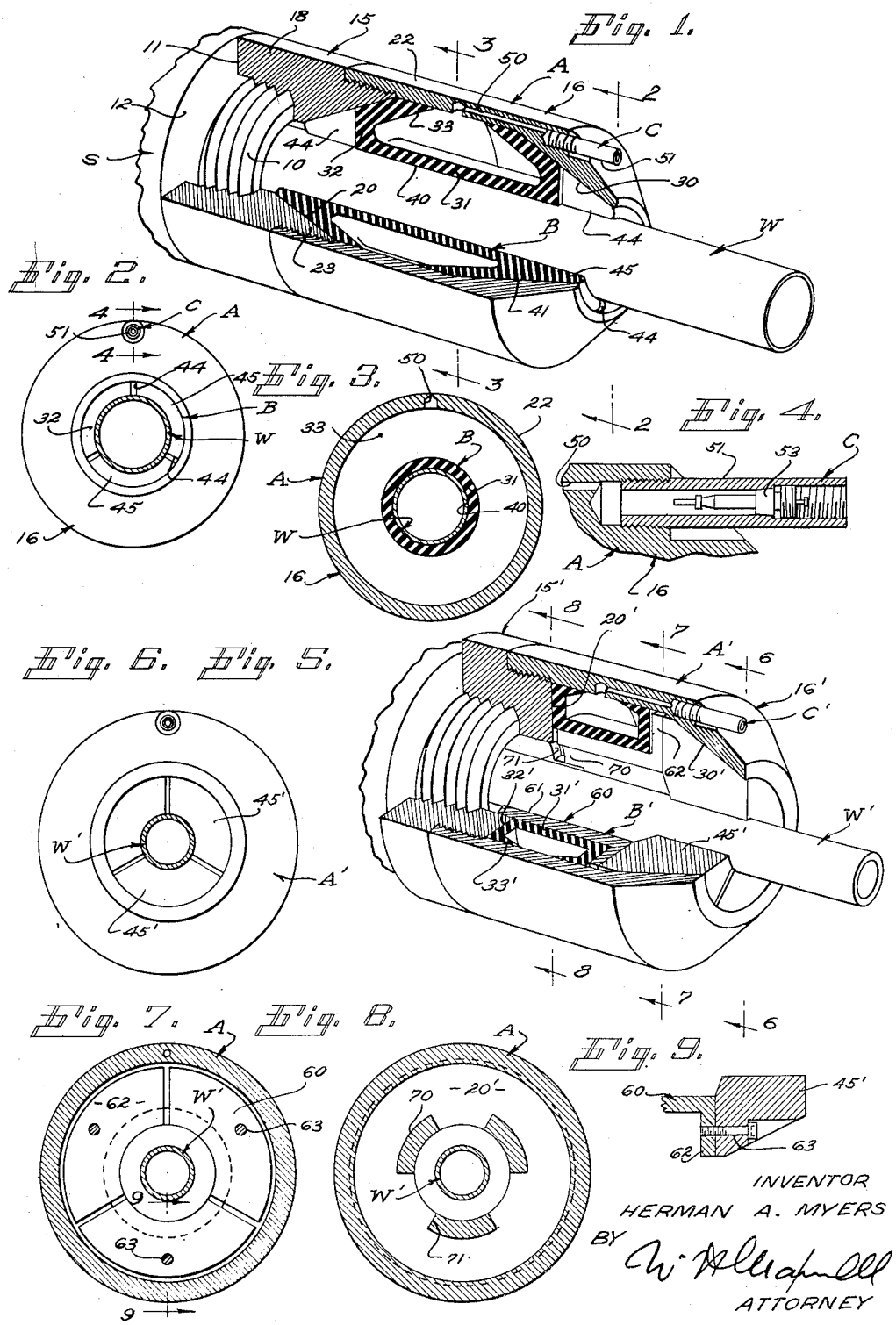
INVENTOR
HERMAN A. MYERS
BY
ATTORNEY Patented Dec. 19, 1950

2,534,527

UNITED STATES PATENT OFFICE 2,534,527

WORK HOLDER

Herman A. Myers, Whittier, Calif.

Application May 4, 1948, Serial No. 24,993

21 Claims. (Cl. 279—4)

This invention is concerned with a work holder and it is a general object of the invention to provide a simple, effective, dependable holder for supporting work in a lathe or like machine. The device provided by the present invention is particularly practical for handling tubular work or elements in a machine such as a lathe, or the like, when operations such as honing, reaming, or light machining are to be performed.

It is a general object of the present invention to provide a device applicable to the spindle of a lathe, or the like, and effective in handling light or thin-walled tubing or elements of work without damage or mutilation.

It is another object of the present invention to provide a device of the general character referred to which is of simple inexpensive construction and which is convenient and practical to operate. The structure provided by the present invention involves few simple parts and it operates smoothly and rapidly.

It is a further object of the present invention to provide a device of the general character referred to which utilizes fluid pressure to set or grip the work, making it unnecessary for the operator to apply the necessary force manually and making it possible to accurately apply a predetermined pressure each time a unit of work is engaged. Through the construction provided by the present invention the operating pressure, that is, the fluid pressure employed serves to uniformly and effectively grip work applied to the device and eliminates entirely uneven application of gripping pressure such as commonly causes distortion of light or thin walled work elements.

The various objects and features of my invention will be fully understood from the following detailed description of typical preferred forms and applications of the invention, throughout which description reference is made to the accompanying drawings, in which:

Fig. 1 is a perspective view of a work holder embodying the present invention, showing it applied to the spindle of a lathe and holding a tubular work part and showing a portion of the structure in section to illustrate the interior thereof. Fig. 2 is a front end elevation of the structure provided by the present invention showing it viewed in the direction indicated by the arrow 2—2 on Fig. 1. Fig. 3 is a transverse sectional view of the structure, being a view taken in the direction indicated by line 3—3 on Fig. 1. Fig. 4 is an enlarged detailed sectional view taken as indicated by line 4—4 on Fig. 2. Fig. 5 is a perspective view similar to Fig. 1, showing another form of construction embodying the present invention. Fig. 6 is a front elevation of the structure shown in Fig. 5, being a view taken in the direction indicated by line 6—6 on Fig. 5. Fig. 7 is a transverse sectional view of the structure taken in the direction indicated by line 7—7 on Fig. 5. Fig. 8 is a transverse sectional view of the structure taken in the direction indicated by line 8—8 on Fig. 5, and Fig. 9 is a detailed sectional view taken substantially as indicated by line 9—9 on Fig. 7.

The holder embodying the present invention may be used on or in connection with various tools or machines and may be employed to handle work parts or elements of various sizes or shapes. The device is particularly useful as applied to the spindle of a lathe and is highly effective in holding tubular work and, therefore, in the drawings I have illustrated a lathe spindle S carrying the holder provided by the present invention and the holder is illustrated as holding a tubular element of work W. The holder is shown applied to the threaded end 10 of the lathe spindle S so that the inner end 11 of the holder engages the shoulder 12 of the spindle. The particular spindle illustrated is of the hollow or tubular type and the tubular work W is shown carried by the holder so as to extend into the lathe spindle.

The work holder provided by the present invention when in the form illustrated in Figs. 1 to 4, inclusive, involves, generally, a body A, a gripper B carried by the body, and operating or control means C for the gripper.

The body A is an elongate tubular structure and in its preferred form it is sectional. The particular body illustrated in the drawings involves two sections, a base section 15 and a head section 16, the sections being combined to form an annular chamber within the body carrying the gripper B.

The base section 15 of the body is an annular or tubular element with a collar portion 18 at its inner end internally threaded to receive the threaded portion 10 of the lathe spindle S. The interior of the base section is formed or shaped to provide a seat 20 receiving the inner end of the gripper B. In the form of the invention under consideration the seat 20 is tapered or inclined as will be seen in Fig. 1 of the drawings.

The head section 16 of body A is an annular or tubular element with a sleeve portion 22 projecting from its inner end and joined to the base section 15 so that the sections 15 and 16 form a rigid unit. In the particular case illustrated the forward end portion 23 of the base section is reduced somewhat and is externally screw threaded to receive the end of the sleeve 22.

The interior of the head section is formed or shaped to present a seat 30 receiving the forward end portion of the gripper. The seat 30 is tapered or inclined and is pitched opposite to the seat 20 at the inner end portion of the body.

From the foregoing description it will be apparent that the base and head sections of the body when joined, as shown in Fig. 1 of the drawings, form or define an annular chamber accommodating the gripper B and having tapered seats at its ends.

The gripper B carried in the annular chamber of the body A may vary considerably in form and construction, as will be apparent from a comparison of Figs. 1 and 5 of the drawings.

In the form of the invention shown in Figs. 1 to 4 of the drawings the gripper involves, generally, a tubular core 31, ends 32 on the ends of the core, and sealing lips 33 on the ends 32.

The core 31 is a centrally located tubular part extending longitudinally of the holder and has a bore or opening 40 through it of such size as to normally pass the work W with suitable clearance. The ends 32 are in the nature of enlargements on the ends of the core and in the case under consideration they have tapered exteriors 41 that seat or fit into the seats 20 and 30 of the body. The ends 32 have slots or openings 44 entering them from their outer ends a substantial distance to divide the ends into circumferentially spaced body portions 45.

The sealing lips 33 are provided on or project from the ends 32, preferably inwardly or toward each other, and they have bearing or sealing engagement with the interior of the body. In the particular case under consideration the lips 33 seal against the interior of the sleeve portion 22 of the body section 16.

In the form of the invention shown in Fig. 1 the gripper B is formed as a single integral unit and is formed of a resilient material such as rubber or a rubber-like composition. In such case the core 31 of the gripper may be contracted or forced inwardly to directly grip the exterior of the work W and when pressure is applied to the annular chamber within the body A around the core 31 and between the ends 32, the ends 32 may be forced apart, in which case the core 31 is extended with the result that the jaw portions 45 wedge against the seats in the body and are consequently forced inwardly into gripping engagement with the exterior of the work W. As a result of the contraction of the core and the wedging action that occurs the gripper is firmly or tightly engaged in the body and the work is tightly gripped in the clipper, the pressure on the work being uniformly distributed around the work and is applied throughout a substantial distance lengthwise of the work, with the result that the work is not crushed or deformed.

The operating or control means C is a valve controlled structure through which fluid under pressure may be admitted into the annular chamber in the body A to act around the core 31 and between the ends 32. In the particular case illustrated the means C involves a passage 50 in the head section of the body extending longitudinally thereof and opening into the chamber in the body between the sealing lips 33.

A tubular extension 51 may be provided on the forward end of the body and when used it is joined with the passage 50. A suitable control valve 52 is carried in the extension 51. The particular structure shown is for handling air in which case the extension 51 forms a part convenient for the application of an air hose and the valve 52 is of the type commonly employed for handling air. It is to be understood that the structure just described may be applied to various parts of the body other than to the forward end portion thereof should it happen that it is impractical to have it in the location illustrated.

In the form of the invention illustrated in Figs. 5 to 9 of the drawings the gripper B' involves a unit formed of rubber, or the like, which unit includes a core 31', ends 32' and sealing lips 33'. In this case jaws 45' cooperate with a tapered seat 30' in the forward end portion of the body A' and a holder 60 extends into the sleeve 31' supporting it clear of the work W'. The holder is coupled to the jaws 45' so that when pressure is applied between the ends 32' the jaws are operated relative to the seat 30' to grip the work W'. It is preferred that there be an annular series of jaws 45' such as is shown in Fig. 6 of the drawings, and that the holder 60 be a sectional structure having a section 61 extending from each jaw into or through the core 31'. In the particular case illustrated each section 61 of the holder has a flange 62 engaging a jaw 45' and joined thereto by a screw fastener 63.

In this form of the invention the base section 15' of the body A' presents a seat 20' which is flat or normal to the longitudinal axis of the structure, the jaws 45' being the only parts of the gripper that contact or engage the work W'. It is desirable in practice that driving engagement be maintained between the body A' and the jaws 45'. In the drawings the desired engagement is established and maintained by extending the inner end portion 70 of the holder sections into longitudinally extending recesses or keyways 71 in the base section 15'. This construction keys the unit formed by the holder and jaws to the base section 15' supplementing the drive established between the jaws and the head section 16' of the body through engagement of the jaws in the tapered seat 30'.

In this form of the invention fluid under pressure, admitted into the annular chamber established in the body A' and maintained therein through the valve of the control means C, acts to expand the unit formed of rubber so that jaws 45' operate on the seats 30' and are forced inwardly into gripping engagement with the work W'. It is to be observed that in this case the holder 60 within the core 31' prevents contraction or inward movement of the core, while the end 32' at the inner or base section of the body is seated on shoulder 20' with the result that the movement is concentrated at the forward end of the structure or on the jaws 45'.

Having described only typical preferred forms and applications of my invention, I do not wish to be limited or restricted to the specific details herein set forth, but wish to reserve to myself any variations or modifications that may appear to those skilled in the art and fall within the scope of the following claims:

Having described my invention, I claim:

1. A work holder of the character described including, a body defining an inwardly opening chamber with a tapered seat, a gripper carried by the body, the gripper being sealed with the body at the chamber and having a plurality of jaws cooperatively engaged with the seat, and means delivering fluid under pressure into the chamber to actuate the gripper.

2. A work holder of the character described including, a body defining an inwardly opening chamber with a tapered seat, a gripper of resilient material carried by the body, the gripper being sealed with the body at the chamber and having a plurality of jaws cooperatively engaged with the seat, and means delivering fluid under pressure into the chamber to actuate the gripper.

3. A work holder of the character described including, a body defining an inwardly opening chamber with a tapered seat, a gripper of rubber carried by the body, the gripper being sealed with the body at the chamber and having an end divided into a plurality of jaws cooperatively engaged with the seat, and means delivering fluid under pressure with the chamber to actuate the gripper.

4. A work holder of the character described including, a body defining an inwardly opening chamber with oppositely tapered seats at its ends, a gripper carried by the body including a core, ends carried by the core and engaged with the seats and sealing lips on the ends having sealing engagement with the body, and a valve controlled passage admitting fluid under pressure into the chamber to operate the gripper.

5. A work holder of the character described including, an elongate tubular body defining an inwardly opening annular chamber concentric with the body and having a tapered seat, a gripper carried by the body and having a tubular core, ends on the core and sealing lips on the ends engaging the body, one of the ends being divided into jaws engaged with said seat, and a valve controlled passage conducting fluid under pressure into the chamber to operate the gripper.

6. A work holder of the character described including, an elongate tubular body defining an inwardly opening annular chamber concentric with the body and having a tapered seat at each end, a gripper carried by the body and having a tubular core, ends on the core and sealing lips on the ends engaging the body, the ends being divided into jaws engaged with the seats, and a valve controlled passage conducting fluid under pressure into the chamber to operate the gripper.

7. A work holder of the character described including, an elongate tubular sectional body defining an inwardly opening annular chamber concentric with the body and having a tapered seat, a gripper carried by the body and having a tubular core, ends on the core and sealing lips on the ends engaging the body, one of the ends being divided into jaws engaged with said seat, and a valve controlled passage conducting fluid under pressure into the chamber to operate the gripper.

8. A work holder of the character described including, an elongate tubular sectional body defining an inwardly opening annular chamber concentric with the body and having a tapered seat in each section of the body, a gripper carried by the body and having a tubular core, ends on the core and sealing lips on the ends engaging the body, one of the ends being divided into jaws engaged with said seat, and a valve controlled passage conducting fluid under pressure into the chamber to operate the gripper.

9. A work holder of the character described including, an elongate tubular body defining an inwardly opening annular chamber concentric with the body and having a tapered seat, a unitary gripper formed of rubber and carried by the body and having a tubular core, ends on the core and sealing lips on the ends engaging the body, one of the ends being divided into jaws engaged with said seat, and a valve controlled passage conducting fluid under pressure into the chamber to operate the gripper.

10. A work holder of the character described including, an elongate tubular body defining an inwardly opening annular chamber with a tapered seat at each end, the body including two sections threaded together and each having a seat therein, a gripper of rubber having a tubular core, ends on the core with jaw portions engaging the seats, and sealing lips on the ends having sealing engagement with the body, and valve controlled means conducting fluid under pressure into the body between said end and around the core.

11. A work holder of the character described including, an elongate tubular body defining an annular chamber having a tapered seat, a plurality of jaws engaging the seat, a flexible core, a holder carried by the jaws and supporting the core, parts carried by the core and having sealing engagement with the body, and valve controlled means admitting fluid under pressure to the chamber.

12. A work holder of the character described including, an elongate tubular body defining an annular chamber having a tapered seat, a plurality of jaws engaging the seat, a flexible core in the chamber, a holder carried by the jaws and supporting the core, the holder including sections carried by the jaws, parts carried by the core and having sealing engagement with the body, and valve controlled means admitting fluid under pressure to the chamber.

13. A work holder of the character described including, an elongate tubular body defining an annular chamber having a tapered seat, a plurality of jaws engaging the seat, a flexible core, a holder carried by the jaws and supporting the core, end parts carried by the ends of the core, and sealing lips on the said parts and having sealing engagement with the body, and valve controlled means admitting fluid under pressure to the chamber.

14. A work holder of the character described including, an elongate tubular body defining an annular chamber having a tapered seat, the body including separable sections, one a base section and the other a head section having the seat therein, a plurality of jaws engaging the seat, a flexible core, a holder carried by the jaws and supporting the core, parts carried by the core and having sealing engagement with the body, and valve controlled means admitting fluid under pressure to the chamber.

15. A work holder of the character described including, an elongate tubular body defining an annular chamber having a tapered seat, the body including separable sections, one a base section and the other a head section having the seat therein, a plurality of jaws engaging the seat, a flexible core, a holder carried by the jaws and supporting the core, parts carried by the core and having sealing engagement with the body, and valve controlled means admitting fluid under pressure to the chamber, the holder having keyed engagement with the base section of the body.

16. A work holder applicable to a rotating threaded support including, a body having threaded engagement with the support and defining a work receiving chamber with a tapered seat therein, wedge parts cooperating with the seat and gripping work in the body, and means actuating said parts including a resilient member within the body actuated by fluid pressure.

17. A work holder applicable to a rotating threaded support including, a body having threaded engagement with the support and defining a work receiving chamber with a tapered seat therein, wedge parts cooperating with the seat and gripping work in the body, and means actuating said parts including a resilient member within the body separate from said parts and actuated by fluid pressure.

18. A work holder applicable to a rotating threaded support including, a body having threaded engagement with the support and defining a work receiving chamber with a tapered seat therein, wedge parts cooperating with the seat and gripping work in the body, and means actuating said parts including a resilient member within the body integral with said parts and actuated by fluid pressure.

19. A work holder applicable to a rotating threaded support including, a tubular body having threads at its inner end engageable with the support and having a tapered seat in its outer end, wedge parts cooperating with the seat and gripping work inserted in the body, and a resilient element in the body actuated by fluid pressure to operate the wedge parts relative to the seat.

20. A work holder applicable to a rotating threaded support including, a tubular body having threads at its inner end engageable with the support and having oppositely pitched internal seats, annular series of wedges engaging the seats and gripping work inserted into the body, and a single expansible element operated by fluid pressure and actuating the series of wedges.

21. A work holder applicable to a rotating threaded support including, a tubular body having threads at its inner end engageable with the support and having a tapered seat in its outer end, rigid wedge parts cooperating with the seat and gripping work inserted in the body, and a resilient element in the body actuated by fluid pressure to operate the wedge parts relative to the seat.

HERMAN A. MYERS.

REFERENCES CITED

The following references are of record in the file of this patent:

UNITED STATES PATENTS

| Number | Name | Date |
| --- | --- | --- |
| 2,004,787 | Gillette | June 11, 1935 |
| 2,267,815 | Bush | Dec. 30, 1941 |